United States Patent [19]

Merchant et al.

[11] Patent Number: 5,827,446
[45] Date of Patent: Oct. 27, 1998

[54] NONAFLUOROMETHOXYBUTANE COMPOSITIONS

[75] Inventors: Abid Nazarali Merchant, Wilmington, Del.; Barbara Haviland Minor, Elkton, Md.

[73] Assignee: E. I. du Pont de Nemours and Company, Wilmington, Del.

[21] Appl. No.: 784,847

[22] Filed: Jan. 15, 1997

Related U.S. Application Data

[60] Provisional application No. 60/010,941 Jan. 31, 1996.

[51] Int. Cl.$^6$ .............................. C09K 5/04; C11D 7/50; C11D 7/26
[52] U.S. Cl. ................ 252/67; 252/305; 264/DIG. 5; 510/410; 510/411; 521/98; 521/131
[58] Field of Search ............... 252/67, 305; 510/411, 510/410, 412; 264/DIG. 5; 521/98, 131

[56] References Cited

U.S. PATENT DOCUMENTS

| | | | |
|---|---|---|---|
| 4,810,403 | 3/1989 | Bivens et al. | 252/67 |
| 5,064,559 | 11/1991 | Merchant et al. | 252/67 |
| 5,064,560 | 11/1991 | Merchant | 252/171 |
| 5,137,932 | 8/1992 | Behme et al. | 521/131 |
| 5,194,170 | 3/1993 | Merchant et al. | 252/67 |
| 5,196,137 | 3/1993 | Merchant | 252/172 |
| 5,221,493 | 6/1993 | Merchant et al. | 252/67 |
| 5,250,208 | 10/1993 | Merchant et al. | 252/67 |
| 5,264,462 | 11/1993 | Hodson et al. | 521/88 |
| 5,580,906 | 12/1996 | Merchant et al. | 521/88 |

FOREIGN PATENT DOCUMENTS

| | | |
|---|---|---|
| 2098057 | 12/1993 | Canada . |
| 12 94 949 | 5/1996 | Germany . |
| 6-71103 | 3/1994 | Japan . |
| 96/22356 | 7/1996 | WIPO . |
| WO 96/22129 | 7/1996 | WIPO . |
| WO 96/22356 | 7/1996 | WIPO . |
| WO96/36689 | 11/1996 | WIPO . |

*Primary Examiner*—Christine Skane

[57] ABSTRACT

Compositions of nonafluoromethoxybutane and at least one component selected from the group consisting of methanol, ethanol, isopropanol, n-heptane, trans-1,2-dichloroethylene, cis-1,2-dichloroethylene and acetone, and 1,1,1,2,3,4,4,5,5, 5-decafluoropentane are described. These compositions are useful as cleaning agents, displacement drying agents, refrigerants, heat transfer media, expansion agents for polyolefins and polyurethanes, aerosol propellants, gaseous dielectrics, fire extinguishing agents, power cycle working fluids, polymerization media, particulate removal fluids, carrier fluids, and buffing abrasive agents.

5 Claims, No Drawings

NONAFLUOROMETHOXYBUTANE COMPOSITIONS

CROSS-REFERENCE TO RELATED APPLICATION

This application claims the benefit of U.S. Provisional Application No. 60/010,941 filed Jan. 31, 1996.

FIELD OF THE INVENTION

This invention relates to compositions containing nonafluoromethoxybutane. These compositions are useful as cleaning agents, displacement drying agents, refrigerants, heat transfer media, expansion agents for polyolefins and polyurethanes, aerosol propellants, gaseous dielectrics, power cycle working fluids, fire extinguishing agents, polymerization media, particulate removal fluids, carrier fluids, and buffing abrasive agents.

BACKGROUND OF THE INVENTION

Fluorinated hydrocarbons have many uses such as cleaning agents or refrigerants. Such compounds include trichlorofluoromethane (CFC-11) and 1,1,2-trichloro-1,2,2-trifluoroethane (CFC-113).

In recent years it has been pointed out that certain kinds of fluorinated hydrocarbon compounds released into the atmosphere may adversely affect the stratospheric ozone layer. Although this proposition has not yet been completely established, there is a movement toward the control of the use and the production of certain chlorofluorocarbons (CFCs) and hydrochlorofluorocarbons (HCFCs) under an international agreement.

Accordingly, there is a demand for the development of new compounds that have a lower ozone depletion potential than existing compounds while still achieving an acceptable performance in cleaning agent and refrigeration applications.

In refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure component or an azeotropic or azeotrope-like composition, the refrigerant composition may change when leaked or discharged to the atmosphere from the refrigeration equipment, which may cause the refrigerant to become flammable or to have poor refrigeration performance.

Accordingly, it is desirable, if possible, to use as a refrigerant a single compound or an azeotropic or azeotrope-like composition of more than one compound.

It is also desirable to find replacements for CFCs and HCFCs for use as a cleaning agent or solvent to clean, for example, electronic circuit boards. Electronic components are soldered to circuit boards by coating the entire circuit side of the board with flux and thereafter passing the flux-coated board over preheaters and through molten solder. The flux cleans the conductive metal parts and promotes solder fusion, but leave residues on the circuit boards that must be removed with a cleaning agent. Fluorinated hydrocarbons are also useful cleaning agents in vapor degreasing operations.

Preferably, cleaning agents should have a low boiling point, nonflammability, low toxicity, and high solvency power so that flux and flux-residues can be removed without damaging the substrate being cleaned. Further, it is desirable that cleaning agents that include a fluorinated hydrocarbon be azeotropic or azeotrope-like so that they do not tend to fractionate upon boiling or evaporation. If the cleaning agent were not azeotropic or azeotrope-like, the more volatile components of the cleaning agent would preferentially evaporate, and the cleaning agent could become flammable or could have less-desirable solvency properties, such as lower rosin flux solvency and lower inertness toward the electrical components being cleaned. The azeotropic property is also desirable in vapor degreasing operations because the cleaning agent is generally redistilled and reused for final rinse cleaning.

Replacements for CFCs and HCFCs may also useful as heat transfer media to transfer heat from a heat source to a heat sink, blowing agents in the manufacture of closed-cell polyurethane, phenolic and thermoplastic foams, as propellants in aerosols, gaseous dielectrics, fire extinguishing agents, power cycle working fluids such as for heat pumps, inert media for polymerization reactions, fluids for removing particulates from metal surfaces, as carrier fluids that may be used, for example, to place a fine film of lubricant on metal parts, as buffing abrasive agents to remove buffing abrasive compounds from polished surfaces such as metal, as displacement drying agents for removing water, such as from jewelry or metal parts, as resist developers in conventional circuit manufacturing techniques including chlorine-type developing agents, or as strippers for photoresists when used with, for example, a chlorohydrocarbon such as 1,1,1-trichloroethane or trichloroethylene.

Accordingly, it has been found that compositions containing nonafluoromethoxybutane have a lower ozone depletion potential and are suitable cleaning agents, displacement drying agents, refrigerants, heat transfer media, expansion agents for polyolefins and polyurethanes, aerosol propellants, gaseous dielectrics, power cycle working fluids, fire extinguishing agents, polymerization media, particulate removal fluids, carrier fluids, and buffing abrasive agents.

SUMMARY OF THE INVENTION

The present invention relates to compositions of nonafluoromethoxybutane and at least one of the following components: methanol, ethanol, isopropanol, n-heptane, trans-1,2-dichloroethylene, cis-1,2-dichloroethylene, acetone, and 1,1,1,2,3,4,4,5,5,5-decafluoropentane.

The present invention also relates to the following binary compositions: a first component, nonafluoromethoxybutane and a second component, wherein the second component is selected from the group consisting of methanol, ethanol, isopropanol, n-heptane, trans-1,2-dichloroethylene, cis-1,2-dichloroethylene and acetone.

The present invention also relates to the following ternary compositions: nonafluoromethoxybutane, n-heptane, and a third component, wherein the third component is selected from the group consisting of methanol, ethanol or isopropanol; nonafluoromethoxybutane, trans-1,2-dichloroethylene and a third component, wherein the third component is methanol, ethanol or isopropanol; nonafluoromethoxybutane, cis-1,2-dichloroethylene and a third component, wherein the third component is methanol or ethanol; and nonafluoromethoxybutane, acetone and a third component, wherein the third component is methanol, ethanol, or isopropanol; nonafluoromethoxybutane, 1,1,1,2,3,4,4,5,5,5-decafluoropentane and methanol.

These compositions are useful as cleaning agents, displacement drying agents, refrigerants, cleaning agents, expansion agents for polyolefins and polyurethanes, aerosol propellants, heat transfer media, gaseous dielectrics, power cycle working fluids, polymerization media, particulate removal fluids, fire extinguishants, carrier fluids, and buffing abrasive agents.

Further, the invention relates to the discovery of binary azeotropic or azeotrope-like compositions comprising effective amounts of these components to form an azeotropic or azeotrope-like composition.

DETAILED DESCRIPTION

The present invention relates to compositions of nonafluoromethoxybutane and at least one of the following components: methanol, ethanol, isopropanol, n-heptane, trans-1,2-dichloroethylene, cis-1,2-dichloroethylene, acetone, and 1,1,1,2,3,4,4,5,5,5-decafluoropentane.

The present invention also relates to the discovery of binary compositions of nonafluoromethoxybutane ($C_4F_9OCH_3$) and methanol, ethanol, isopropanol, n-heptane, trans-1,2-dichloroethylene (t-DCE), cis-1,2-dichloroethylene (c-DCE), or acetone; and ternary compositions of $C_4F_9OCH_3$, n-heptane and methanol, ethanol, or isopropanol; $C_4F_9OCH_3$, t-DCE, and methanol, ethanol or isopropanol; $C_4F_9OCH_3$, c-DCE, and methanol or ethanol; $C_4F_9OCH_3$, acetone, and methanol, ethanol or isopropanol; and $C_4F_9OCH_3$, 1,1,1,2,3,4,4,5,5,5-decafluoropentane (HFC-43-10mee) and methanol. 1–99 wt. % of each of the components in the above compositions can be used as cleaning agents, displacement drying agents, refrigerants, expansion agents for polyolefins and polyurethanes, aerosol propellants, heat transfer media, gaseous dielectrics, fire extinguishants, power cycle working fluids, polymerization media, particulate removal fluids, carrier fluids, and buffing abrasive agents.

The present invention also relates to the discovery of azeotropic or azeotrope-like compositions of effective amounts of $C_4F_9OCH_3$ and methanol, ethanol, isopropanol, n-heptane, t-DCE, c-DCE, or acetone; $C_4F_9OCH_3$, n-heptane and methanol, ethanol or isopropanol; $C_4F_9OCH_3$, t-DCE and methanol, ethanol or isopropanol; $C_4F_9OCH_3$, c-DCE and methanol or ethanol; $C_4F_9OCH_3$, acetone and methanol, ethanol, or isopropanol; $C_4F_9OCH_3$, HFC-43-10mee and methanol to form an azeotropic or azeotrope-like composition.

Nonafluoromethoxybutane ($C_4F_9OCH_3$) isomers of the present invention include 1,1,1,3,3,3-hexafluoro-2-methoxy-2-(trifluoromethyl)-propane ($CH_3OC(CF_3)_3$), 1,1,1,2,2,3,3,4,4-nonafluoro-4-methoxy-butane ($CH_3OCF_2CF_2CF_2CF_3$), 1,1,1,2,3,3-hexafluoro-2-(trifluoromethyl)-3-methoxy-propane ($CH_3OCF_2CF(CF_3)_2$), and 1,1,1,2,3,3,4,4,4-nonafluoro-2-methoxybutane ($CH_3OCF(CF_3)CF_2CF_3$) with approximate isomer boiling points of 60° C. Other components of the compositions of the present invention include the following:

1. methanol ($CH_3OH$), boiling point=65° C.
2. ethanol ($CH_3CH_2OH$), boiling point=78° C.
3. isopropanol (($CH_3)_2CHOH$), boiling point=82° C.
4. n-heptane ($CH_3(CH_2)_5CH_3$), boiling point=98° C.
5. trans-1,2-dichloroethylene (CHCl=CHCl), boiling point=48° C.
6. cis-1,2-dichloroethylene (CHCl=CHCl), boiling point=60° C.
7. acetone, ($CH_3COCH_3$), boiling point=56° C.
8. 1,1,1,2,3,4,4,5,5,-decafluoropentane, ($CF_3CHFCHFCF_2CF_3$), boiling point=54.6° C.

By "azeotropic" composition is meant a constant boiling liquid admixture of two or more substances that behaves as a single substance. One way to characterize an azeotropic composition is that the vapor produced by partial evaporation or distillation of the liquid has the same composition as the liquid from which it was evaporated or distilled, that is, the admixture distills/refluxes without compositional change. Constant boiling compositions are characterized as azeotropic because they exhibit either a maximum or minimum boiling point, as compared with that of the non-azeotropic mires of the same components.

By "azeotrope-like" composition is meant a constant boiling, or substantially constant boiling, liquid admixture of two or more substances that behaves as a single substance. One way to characterize an azeotrope-like composition is that the vapor produced by partial evaporation or distillation of the liquid has substantially the same composition as the liquid from which it was evaporated or distilled, that is, the admixture distills/refluxes without substantial composition change. Another way to characterize an azeotrope-like composition is that the bubble point vapor pressure and the dew point vapor pressure of the composition at a particular temperature are substantially the same.

It is recognized in the art that a composition is azeotrope-like if, after 50 weight percent of the composition is removed such as by evaporation or boiling off, the difference in vapor pressure between the original composition and the composition remaining after 50 weight percent of the original composition has been removed is less than 10 percent, when measured in absolute units. By absolute units, it is meant measurements of pressure and, for example, psia, atmospheres, bars, torr, dynes per square centimeter, millimeters of mercury, inches of water and other equivalent terms well known in the art. If an azeotrope is present, there is little difference in vapor pressure between the original composition and the composition remaining after 50 weight percent of the original composition has been removed.

Therefore, included in this invention are compositions of effective amounts of $C_4F_9OCH_3$, methanol, ethanol, isopropanol, n-heptane, t-DCE, c-DCE, or acetone; $C_4F_9OCH_3$, n-heptane and methanol, ethanol, or isopropanol; $C_4F_9OCH_3$, t-DCE and methanol, ethanol or isopropanol; $C_4F_9OCH_3$, c-DCE and methanol or ethanol; $C_4F_9OCH_3$, acetone and methanol, ethanol or isopropanol; $C_4F_9OCH_3$, HFC-43-10mee and methanol such that after 50 weight percent of an original composition is evaporated or boiled off to produce a remaining composition, the difference in the vapor pressure between the original composition and the remaining composition is 10 percent or less.

For compositions that are azeotropic, there is usually some range of compositions around the azeotrope point that, for a maximum boiling azeotrope, have boiling points at a particular pressure higher than the pure components of the composition at that pressure and have vapor pressures at a particular temperature lower than the pure components of the composition at that temperature, and that, for a minimum boiling azeotrope, have boiling points at a particular pressure lower than the pure components of the composition at that pressure and have vapor pressures at a particular temperature higher than the pure components of the composition at that temperature. Boiling temperatures and vapor pressures above or below that of the pure components are caused by unexpected intermolecular forces between and among the molecules of the compositions, which can be a combination of repulsive and attractive forces such as van der Waals forces and hydrogen bonding.

The range of compositions that have a maximum or minimum boiling point at a particular pressure, or a maximum or minimum vapor pressure at a particular temperature, may or may not be coextensive with the range of compositions that have a change in vapor pressure of less than about 10% when 50 weight percent of the composition is evaporated. In those cases where the range of compositions that have maximum or minimum boiling temperatures at a particular pressure, or maximum or minimum vapor pressures at a particular temperature, are broader than the range of compositions that have a change in vapor pressure of less than about 10% when 50 weight percent of the composition is evaporated, the unexpected intermolecular forces are nonetheless believed important in that the refrigerant compositions having those forces that are not substantially constant boiling may exhibit unexpected increases in the capacity or efficiency versus the components of the refrigerant composition.

The components of the compositions of this invention have the following vapor pressures:

| Component | 25° C. Psia | 50° C. Psia | 75° C. Psia | 100° C. Psia | 110° C. Psia |
|---|---|---|---|---|---|
| $C_4F_9OCH_3$ | 4.07 | 10.47 | 23.56 | 47.52 | 61.32 |
| Methanol | 2.33 | 7.71 | 20.93 | 48.85 | 66.20 |
| Ethanol | 1.14 | 4.26 | 12.82 | 32.66 | 45.67 |
| Isopropanol | 0.82 | 3.42 | 10.91 | 28.70 | 40.44 |
| n-Heptane | 0.88 | 2.74 | 6.99 | 15.39 | 20.39 |
| t-DCE | 6.41 | 15.88 | 33.94 | 64.71 | 81.59 |
| c-DCE | 3.91 | 10.30 | 23.14 | 45.98 | 58.84 |
| Acetone | 4.45 | 11.85 | 26.79 | 53.40 | 68.36 |

Substantially constant boiling, azeotropic or azeotrope-like compositions of this invention comprise the following at the temperature specified:

| COMPONENTS | T (°C.) | WEIGHT RANGES (wt. %/wt/%) | PREFERRED (wt. %/wt. %) |
|---|---|---|---|
| $C_4F_9OCH_3$/methanol | 25 | 82–99/1–18 | 92–99/1–8 |
| $C_4F_9OCH_3$/ethanol | 75 | 75–99/1–25 | 90–99/1–10 |
| $C_4F_9OCH_3$/isopropanol | 100 | 64–99/1–36 | 85–99/1–15 |
| $C_4F_9OCH_3$/n-heptane | 50 | 71–99/1–29 | 90–99/1–10 |
| $C_4F_9OCH_3$/t-DCE | 25 | 31–78/22–69 | 40–70/30–60 |
| $C_4F_9OCH_3$/c-DCE | 25 | 44–85/15–56 | 55–75/25–45 |
| $C_4F_9OCH_3$/acetone | 25 | 1–99/1–99 | 60–99/1–40 |
| $C_4F_9OCH_3$/n-heptane/methanol | 25 | 80–99/0.5–18/0.5–19 | 90–99/0.5–10/0.5–10 |
| $C_4F_9OCH_3$/n-heptane/ethanol | 75 | 75–99/0.5–24/0.5–24 | 88–99/0.5–12/0.5–10 |
| $C_4F_9OCH_3$/n-heptane/isopropanol | 100 | 70–99/0.5–29/0.5–29 | 82–99/0.5–12/0.5–12 |
| $C_4F_9OCH_3$/t-DCE/methanol | 25 | 20–74/24–75/0.5–12 | 30–60/30–60/0.5–10 |
| $C_4F_9OCH_3$/t-DCE/ethanol | 100 | 28–74/24–70/0.1–12 | 30–60/30–60/0.1–8 |
| $C_4F_9OCH_3$/t-DCE/isopropanol | 41 | 29–70/29–70/0.1–12 | 35–65/30–60/0.1–8 |
| $C_4F_9OCH_3$/c-DCE/methanol | 25 | 39–82/16–59/0.1–12 | 45–70/25–50/0.1–8 |
| $C_4F_9OCH_3$/c-DCE/ethanol | 110 | 41–80/19–58/0.1–14 | 45–70/25–50/0.1–10 |
| $C_4F_9OCH_3$/acetone/methanol | 25 | 0.5–99/0.5–99/0.5–40 | 40–99/0.5–50/0.5–20 |
| $C_4F_9OCH_3$/acetone/ethanol | 75 | 0.5–99/0.5–99/0.5–30 | 40–99/0.5–50/0.5–15 |
| $C_4F_9OCH_3$/acetone/isopropanol | 75 | 0.5–99/0.5–99/0.5–30 | 40–99/0.5–50/0.5–15 |
| $C_4F_9OCH_3$/HFC-43-10-mee/methanol | 47 | 20–75/20–70/0.5–15 | 30–60/30–60/0.5–10 |

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective amount includes the amounts, such as may be expressed in weight percentages, of each component of the compositions of the instant invention which form azeotropic or azeotrope-like compositions at temperatures or pressures other than as described herein.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotropelike in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of several criteria:

The composition can be defined as an azeotrope of A, B, C (and D . . . ) since the very term "azeotrope" is at once both definitive and limitative, and requires that effective amounts of A, B, C (and D . . . ) for this unique composition of matter which is a constant boiling composition.

It is well known by those skilled in the art, that, at different pressures, the composition of a given azeotrope will vary at least to some degree, and changes in pressure will also change, at least to some degree, the boiling point temperature. Thus, an azeotrope of A, B, C (and D . . . ) represents a unique type of relationship but with a variable composition which depends on temperature and/or pressure. Therefore, compositional ranges, rather than fixed compositions, are often used to define azeotropes.

The composition can be defined as a particular weight percent relationship or mole percent relationship of A, B, C (and D . . . ), while recognizing that such specific values point out only one particular relationship and that in actuality, a series of such relationships, represented by A, B, C (and D . . . ) actually exist for a given azeotrope, varied by the influence of pressure.

An azeotrope of A, B, C (and D . . . ) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The azeotrope or azeotrope-like compositions of the present invention can be prepared by any convenient method including mixing or combining the desired amounts. A preferred method is to weigh the desired component amounts and thereafter combine them in an appropriate container.

Specific examples illustrating the invention are given below. Unless otherwise stated therein, all percentages are by weight. It is to be understood that these examples are merely illustrative and in no way are to be interpreted as limiting the scope of the invention. In the following Examples, 1,1,1,3,3,3-hexafluoro-2-methoxy2-(trifluoromethyl)-propane was used. However, all isomers of $C_4F_9OCH_3$ are believed to provide similar results.

EXAMPLE 1

A solution containing 94.9 weight percent $C_4F_9OCH_3$ and 5.1 weight percent isopropanol was prepared in a sutable container and mixed thoroughly. The solution was distilled in a five plate Oldershaw distillation column using a 10:1 reflux to take-off ratio. Head and pot temperatures were read directly to 1° C. The pressure was 756.46 mmHg. Distillate compositions were determined by gas chromatography. Results obtained are summarized in Table 1.

TABLE 1

| Cuts | Temp °C. Head | Wt % Distilled or Recovered | $C_4F_9OCH_3$ | Weight Percentages Isopropanol |
|---|---|---|---|---|
| 1 | 54 | 9.7 | 93.9 | 6.1 |
| 2 | 55 | 19.2 | 93.9 | 6.1 |
| 3 | 55 | 28.9 | 93.9 | 6.1 |
| 4 | 55 | 38.5 | 93.9 | 6.1 |
| 5 | 55 | 48.3 | 93.9 | 6.1 |
| 6 | 55 | 58.2 | 93.9 | 6.1 |
| 7 | 55 | 68.0 | 93.9 | 6.1 |
| 8 | 55 | 77.6 | 94.3 | 5.7 |
| HEEL | — | 92.1 | 99.3 | 0.7 |

Analysis of the above data indicate very small differences between head temperatures and distillate compositions as the distillation progressed. A stastical analysis of the data indicates that the true binary azeotrope of $C_4F_9OCH_3$ and isopropanol has the following characteristics at atmospheric pressure (99 percent confidence limits):

$C_4F_9OCH_3$ =93.9+/−0.1
isopropanol=6.1+/−0.1
Boiling Pt, °C=54.9+/−0.9

EXAMPLE 2

A solution containing 49.5 weight percent $C_4F_9OCH_3$, 48.8 weight percent trans-1,2-dichloroethylene and 1.7 weight percent methanol was prepared in a suitable container and mixed thoroughly. The solution was distilled in a five plate Oldershaw distillation column using a 10:1 reflux to take-off ratio. Head and pot temperatures were read directly to 1° C. The pressure was 758.23 mmHg. Distillate compositions were determined by gas chromatography. Results obtained are summarized in Table 2.

TABLE 2

| Cuts | Temp °C. Head | Wt % Distilled or Recovered | $C_4F_9OCH_3$ | Weight t-DCB | Percentages Methanol |
|---|---|---|---|---|---|
| 1 | 36 | 9.5 | 54.1 | 41.0 | 4.9 |
| 2 | 36 | 19.0 | 53.8 | 41.1 | 5.0 |
| 3 | 38 | 28.9 | 53.7 | 41.5 | 4.8 |
| 4 | 41 | 38.8 | 54.3 | 44.5 | 1.1 |
| 5 | 41 | 48.9 | 54.9 | 45.0 | 0.03 |
| 6 | 41 | 59.4 | 54.8 | 45.2 | ND |
| 7 | 41 | 69.8 | 54.2 | 45.8 | ND |
| 8 | 41 | 80.7 | 54.6 | 45.4 | ND |
| HEEL | — | 91.0 | 37.8 | 62.2 | ND |

Analysis of the above data indicate very small differences between head temperatures and distillate compositions early in the distillation before the methanol was depleted. This is an indication of a ternary azeotrope between $C_4F_9OCH_3$/t-DCE and methanol. Data later in the distillation indicate a binary azeotrope between $C_4F_9OCH_3$ and t-DCE. A statistical analysis of the data indicates that the true azeotropes of have the following characteristics at atmospheric pressure (99 percent confidence limits):

$C_4F_9OCH_3$=53.9+/−0.6
t-DCE=41.2+/−0.9
Methanol=4.9+/−0.4
Boiling Pt, °C.=36.7+/−3.5

$C_4F_9OCH_3$=54.6+/−1.0
t-DCE=45.4+/−1.0
Boiling Pt, °C.=41.0+/−0.5

EXAMPLE 3

A solution containing 55.0 weight percent $C_4F_9OCH_3$, 40.0 weight percent trans-1,2-dichloroethylene and 5.0 weight percent isopropanol was prepared in a suitable container and mixed thoroughly. The solution was distilled in a five plate Oldershaw distillation column using a 10:1 reflux to take-off ratio. Head and pot temperatures were read directly to 1° C. The pressure was 764.23 mmHg. Distillate compositions were determined by gas chromatography. Results obtained are summarized in Table 3.

TABLE 3

| Cuts | Temp °C. Head | Wt % Distilled or Recovered | $C_4F_9OCH_3$ | Weight t-DCB | Percentages Isopropanol |
|---|---|---|---|---|---|
| 1 | 41 | 9.9 | 51.8 | 46.9 | 1.3 |
| 2 | 41 | 20.1 | 52.0 | 46.7 | 1.3 |
| 3 | 41 | 30.3 | 52.0 | 46.6 | 1.3 |
| 4 | 41 | 40.2 | 52.1 | 46.5 | 1.4 |
| HEEL | — | 91.6 | 61.8 | 5.2 | 33.0 |

Analysis of the above data indicate very small differences between head temperatures and distillate compositions as the distillation progressed. A stastical analysis of the data indicates that the true ternary azeotrope of $C_4F_9OCH_3$, t-DCE and isopropanol has the following characteristics at atmospheric pressure (99 percent confidence limits):

$C_4F_9OCH_3$=52.0+/−0.3
t-DCE=46.7+/−0.4
Isopropanol=1.3+/−0.1
Boiling Pt, °C.=41.0+/−0.5

EXAMPLE 4

A solution containing 40.0 weight percent $C_4F_9OCH_3$, 50.0 weight percent HFC-43-10mee and 10.0 weight percent methanol was prepared in a suitable container and mixed thoroughly. The solution was distilled in a five plate Oldershaw distillation column using a 10:1 reflux to take-off ratio. Head and pot temperatures were read directly to 1° C. The pressure was 759.30 mmHg. Distillate compositions were determined by gas chromatography. Results obtained are summarized in Table 4.

TABLE 4

| Cuts | Temp °C. Head | Wt % Distilled or Recovered | $C_4F_9OCH_3$ | Weight 43-10mee | Percentages Methanol |
|---|---|---|---|---|---|
| 1 | 46 | 10.8 | 42.0 | 51.2 | 6.8 |
| 2 | 46 | 21.0 | 43.6 | 49.4 | 7.0 |
| 3 | 47 | 31.0 | 44.9 | 48.0 | 7.1 |
| 4 | 47 | 40.9 | 45.7 | 47.2 | 7.1 |
| 5 | 47 | 51.0 | 45.7 | 47.1 | 7.2 |
| 6 | 47 | 61.1 | 44.7 | 48.0 | 7.3 |
| HEEL | — | 91.9 | 16.7 | 51.5 | 31.7 |

Analysis of the above data indicate very small differences between head temperatures and distillate compositions as the distillation progressed. A stastical analysis of the data indicates that the true ternary azeotrope of $C_4F9OCH_3$, HFC-43-10mee and methanol has the following characteristics at atmospheric pressure (99 percent confidence limits):

$C_4F_9OCH_3$=44.9+/−2.6
HFC-43-10mee=48.0+/−2.8
Methanol=7.1+/−0.4
Boiling Pt, °C.=46.8+/−1.3

EXAMPLE 5

A solution containing 40.0 weight percent $C_4F_9OCH_3$, and 15.7 weight percent acetone was prepared in a suitable container and mixed thoroughly. The solution was distilled in a five plate Oldershaw distillation column using a 10:1 reflux to take-off ratio. Head and pot temperatures were read directly to 1° C. The pressure was 757.40 mmHg. Distillate compositions were determined by gas chromatography. Results obtained are summarized in Table 5.

TABLE 5

| Cuts | Temp °C. Head | Wt % Distilled or Recovered | Weight $C_4F_9OCH_3$ | Percentages Acetone |
|---|---|---|---|---|
| 1 | 50 | 8.9 | 73.8 | 26.2 |
| 2 | 51 | 17.9 | 72.6 | 27.4 |
| 3 | 51 | 26.9 | 73.7 | 26.3 |
| 4 | 51 | 36.1 | 74.6 | 25.4 |
| HEEL | — | 92.9 | 99.5 | 0.5 |

Analysis of the above data indicate very small differences between head temperatures and distillate compositions as the distillation progressed. A stastical analysis of the data indicates that the true ternary azeotrope of $C_4F_9OCH_3$ and acetone has the following characteristics at atmospheric pressure (99 percent confidence limits):

$C_4F_9OCH_3$=73.6+/−2.5
Acetone=26.4+/−2.5
Boiling Pt, °C.=50.7+/−1.5

EXAMPLE 6

A suitable container was filled with mixtures shown in Table 5 and heated to the boiling point. Stainless steel nuts and bolts coated with various residues were suspended in the container for 10 seconds then removed and observed. Results are reported in Table 5. Solubilities of each mixture with each residue are also shown.

| Weight % | Krytox ® Oil | Tapmatic Cutting Fluid | Dow 1107 Silicone Oil | Mil-H-5606 Hydraulic Fluid |
|---|---|---|---|---|
| $C_4F_9OCH_3$/ Isopropanol (9416) -Solubility- | 100% Removed Up to 50% | 95% Removed Up to 1% | 95% Removed None | 95% Removed None |
| $C_4F_9OCH_3$/ T-DCE/ Methanol (54/43.5/2.5) -Solubility | 100% Removed Up to 10% | 100% Removed Up to 50% | 100% Removed Up to 50% | 98% Removed Up to 1% |
| $C_4F_9OCH_3$ t-DCE/ Isopropanol (52/46.5/1.5) -Solubility | 100% Removed Up to 10% | 100% Removed Up to 50% | 100% Removed Up to 50% | 100% Removed Up to 1% |
| $C_4F_9OCH_3$/ HFC-43-10mee Methanol (45/48/7) -Solubility | 100% Removed Up to 40% | 98% Removed Up to 1% | 95% Removed None | 90% Removed None |
| $C_4F_9OCH_3$/ Acetone (85/15) -Solubility | 100% Removed Up to 50% | 100% Removed Up to 1% | 100% Removed Up to 1% | 95% Removed None |

Analysis of the above data indicate these mixtures remove significant amounts of residue and have some solubility in the residues tested. $C_4F_9OCH_3$/t-DCE/Methanol (54/43.5/2.5) and $C_4F_9OCH_3$/t-DCE/Isopropanol (52/46.5/1.5) also removed 100% of Alpha 611F RMA flux at room temperature.

EXAMPLE 7

Phase Study

A phase study shows the following compositions are azeotropic at the temperature specified:

| Composition | Weight Percents | Vapor Press. psia | kPa | T (°C.) |
|---|---|---|---|---|
| $C_4F_9OCH_3$/methanol | 97.1/2.9 | 4.21 | 29.0 | 25 |
| $C_4F_9OCH_3$/ethanol | 98.0/2.0 | 23.71 | 163 | 75 |
| $C_4F_9OCH_3$/n-heptane | 97.0/3.0 | 10.56 | 72.8 | 50 |
| $C_4F_9OCH_3$/c-DCE | 68.9/31.1 | 7.00 | 48.3 | 25 |
| $C_4F_9OCH_3$/n-heptane/methanol | 93.2/3.4/3.4 | 4.25 | 29.3 | 25 |
| $C_4F_9OCH_3$/n-heptane/ethanol | 92.0/5.2/2.8 | 24.11 | 166 | 75 |
| $C_4F_9OCH_3$/n-heptane/isopropanol | 89.1/5.5/5.4 | 49.26 | 340 | 100 |
| $C_4F_9OCH_3$/t-DCE/ethanol | 54.4/44.7/0.9 | 87.56 | 604 | 100 |
| $C_4F_9OCH_3$/c-DCE/methanol | 66.0/32.6/1.4 | 7.05 | 48.6 | 25 |
| $C_4F_9OCH_3$/c-DCE/ethanol | 66.3/32.8/0.9 | 98.76 | 681 | 110 |

EXAMPLE 8

Impact of Vapor Leakage on Vapor Pressure

A vessel is charged with an initial composition at a specified temperature, and the vapor pressure of the composition is measured. The composition is allowed to leak from the vessel, while the temperature is held constant at the temperature specified, until 50 weight percent of the initial composition is removed, at which time the vapor pressure of the composition remaining in the vessel is measured. The results are summarized below.

| Refrigerant Weight Percent | 0 wt % evaporated Psia | kPa | 50 wt % evaporated Psia | kPa | % Change |
|---|---|---|---|---|---|
| $C_4F_9OCH_3$/methanol (25° C.) | | | | | |
| 97.1/2.9 | 4.21 | 29.0 | 4.21 | 29.0 | 0.0 |
| 99/1 | 4.16 | 28.7 | 4.15 | 28.6 | 0.2 |
| 90/10 | 4.05 | 27.9 | 3.92 | 27.0 | 3.2 |
| 82/18 | 3.80 | 26.2 | 3.43 | 23.6 | 9.7 |
| 81/19 | 3.77 | 26.0 | 3.37 | 23.2 | 10.6 |
| $C_4F_9OCH_3$/ethanol (75° C.) | | | | | |
| 98.0/2.0 | 23.71 | 163 | 23.71 | 163 | 0.0 |
| 99/1 | 23.67 | 163 | 23.67 | 163 | 0.0 |
| 90/10 | 22.90 | 158 | 22.50 | 155 | 1.7 |
| 80/20 | 21.50 | 148 | 20.04 | 138 | 6.8 |
| 75/25 | 20.84 | 144 | 18.77 | 129 | 9.9 |
| 74/26 | 20.71 | 143 | 18.53 | 128 | 10.5 |
| $C_4F_9OCH_3$/isopropanol (100° C.) | | | | | |
| 94.9/5.1 | 48.47 | 334 | 48.47 | 334 | 0.0 |
| 99/1 | 47.92 | 330 | 47.87 | 330 | 0.1 |
| 80/20 | 46.28 | 319 | 44.94 | 310 | 2.9 |
| 70/30 | 44.25 | 305 | 41.21 | 284 | 6.9 |
| 64/36 | 43.01 | 297 | 38.86 | 268 | 9.6 |
| 63/37 | 42.81 | 295 | 38.47 | 265 | 10.1 |
| $C_4F_9OCH_3$/n-heptane (50° C.) | | | | | |
| 97.0/3.0 | 10.56 | 72.8 | 10.56 | 72.8 | 0.0 |
| 99/1 | 10.52 | 72.5 | 10.52 | 72.5 | 0.0 |
| 90/10 | 10.38 | 71.6 | 10.26 | 70.7 | 1.2 |
| 80/20 | 9.99 | 68.9 | 9.54 | 65.8 | 4.5 |
| 71/29 | 9.68 | 66.7 | 8.74 | 60.3 | 9.7 |
| 70/30 | 9.64 | 66.5 | 8.61 | 59.4 | 10.7 |
| $C_4F_9OCH_3$/t-DCE (25° C.) | | | | | |
| 53.9/46.1 | 8.76 | 60.4 | 8.76 | 60.4 | 0.0 |
| 60/40 | 8.75 | 60.3 | 8.73 | 60.2 | 0.2 |
| 70/30 | 8.69 | 59.9 | 8.47 | 58.4 | 2.5 |
| 78/22 | 8.54 | 58.9 | 7.70 | 53.1 | 9.8 |
| 79/21 | 8.50 | 58.6 | 7.53 | 51.9 | 11.4 |
| 40/60 | 8.74 | 60.3 | 8.65 | 59.6 | 1.0 |
| 32/68 | 8.70 | 60.0 | 8.07 | 55.6 | 7.2 |
| 31/69 | 8.70 | 60.0 | 7.85 | 54.1 | 9.8 |
| $C_4F_9OCH_3$/c-DCE (25° C.) | | | | | |
| 68.9/31.1 | 7.00 | 48.3 | 7.00 | 48.3 | 0.0 |
| 80/20 | 6.96 | 48.0 | 6.82 | 47.0 | 2.0 |
| 85/15 | 6.89 | 47.5 | 6.34 | 43.7 | 8.0 |
| 86/14 | 6.86 | 47.3 | 6.16 | 42.5 | 10.2 |
| 50/50 | 6.97 | 48.1 | 6.91 | 47.6 | 0.9 |
| 44/56 | 6.96 | 48.0 | 6.51 | 44.9 | 6.5 |
| 43/57 | 6.96 | 48.0 | 5.88 | 40.5 | 15.5 |
| $C_4F_9OCH_3$/acetone (25° C.) | | | | | |
| 84.3/15.7 | 3.86 | 26.6 | 3.86 | 26.6 | 0.0 |
| 92/8 | 3.90 | 26.9 | 3.90 | 26.9 | 0.0 |
| 99/1 | 4.03 | 27.8 | 4.03 | 27.8 | 0.0 |
| 70/30 | 3.93 | 27.1 | 3.91 | 27.0 | 0.5 |
| 50/50 | 4.10 | 28.3 | 4.06 | 28.0 | 1.0 |
| 40/60 | 4.19 | 28.9 | 4.14 | 28.5 | 1.2 |
| 20/80 | 4.34 | 29.9 | 4.30 | 29.6 | 0.9 |
| 1/99 | 4.44 | 30.6 | 4.44 | 30.6 | 0.0 |
| $C_4F_9OCH_3$/n-heptane/methanol (25° C.) | | | | | |
| 93.2/3.4/3.4 | 4.25 | 29.3 | 4.25 | 29.3 | 0.0 |
| 99/0.5/0.5 | 4.13 | 28.5 | 4.12 | 28.4 | 0.2 |
| 90/5/5 | 4.23 | 29.2 | 4.22 | 29.1 | 0.2 |
| 90/1/9 | 4.11 | 28.3 | 4.00 | 27.6 | 2.7 |
| 90/9/1 | 4.12 | 28.4 | 4.04 | 27.9 | 1.9 |
| 85/10/5 | 4.19 | 28.9 | 4.16 | 28.7 | 0.7 |
| 85/5/10 | 4.12 | 28.4 | 4.06 | 28.0 | 1.5 |
| 85/14/1 | 4.04 | 27.9 | 3.90 | 26.7 | 3.5 |
| 85/1/14 | 3.96 | 27.3 | 3.70 | 25.5 | 6.6 |
| 80/10/10 | 4.10 | 28.3 | 4.02 | 27.7 | 2.0 |
| 70/15/15 | 3.94 | 27.2 | 3.76 | 25.9 | 4.6 |
| 80/1/19 | 3.81 | 26.3 | 3.39 | 23.4 | 11.0 |
| 80/2/18 | 3.87 | 26.7 | 3.48 | 24.0 | 10.1 |
| 80/19/1 | 3.98 | 27.4 | 3.76 | 25.9 | 5.5 |
| $C_4F_9OCH_3$/n-heptane/ethanol (75° C.) | | | | | |
| 92.0/5.2/2.8 | 24.11 | 166 | 24.11 | 166 | 0.0 |
| 99/0.5/0.5 | 23.71 | 163 | 23.69 | 163 | 0.1 |
| 80/14/6 | 23.67 | 163 | 23.45 | 162 | 0.9 |
| 80/1/19 | 21.85 | 151 | 20.43 | 141 | 6.5 |
| 80/19/1 | 23.14 | 160 | 22.36 | 154 | 3.4 |
| 75/15/10 | 23.29 | 161 | 22.93 | 158 | 1.5 |
| 75/1/24 | 21.18 | 146 | 19.15 | 132 | 9.6 |
| 75/24/1 | 22.77 | 157 | 21.57 | 149 | 5.3 |
| $C_4F_9OCH_3$/n-heptane/isopropanol (100° C.) | | | | | |
| 89.1/5.5/5.4 | 49.26 | 340 | 49.26 | 340 | 0.0 |
| 99/0.5/0.5 | 47.91 | 330 | 47.85 | 330 | 0.1 |
| 89/10/1 | 48.25 | 333 | 47.93 | 330 | 0.7 |
| 89/1/10 | 48.37 | 334 | 48.13 | 332 | 0.5 |
| 80/10/10 | 48.76 | 336 | 48.53 | 335 | 0.5 |
| 80/1/19 | 46.76 | 322 | 45.50 | 314 | 2.7 |
| 80/19/1 | 46.91 | 323 | 45.39 | 313 | 3.2 |
| 70/15/15 | 47.62 | 323 | 45.39 | 313 | 3.2 |
| 70/1/29 | 44.73 | 308 | 41.79 | 288 | 6.6 |
| 70/29/1 | 45.37 | 313 | 41.75 | 288 | 8.0 |
| $C_4F_9OCH_3$/t-DCE/methanol (25° C.) | | | | | |
| 49.5/48.8/1.7 | 8.85 | 61.0 | 8.85 | 61.0 | 0.0 |
| 50/49.5/0.5 | 8.81 | 60.4 | 8.80 | 60.3 | 0.1 |
| 50/44/6 | 8.71 | 60.1 | 8.56 | 59.0 | 1.7 |
| 50/40/10 | 8.52 | 58.7 | 7.98 | 55.0 | 6.3 |
| 40/50/10 | 8.52 | 58.7 | 8.26 | 57.0 | 3.1 |
| 40/48/12 | 8.44 | 58.2 | 8.02 | 55.3 | 5.0 |
| 50/39/11 | 8.47 | 58.4 | 7.75 | 53.4 | 8.5 |
| 35/60/5 | 8.71 | 60.1 | 8.62 | 59.4 | 1.0 |
| 30/65/5 | 8.6T | 59.8 | 8.53 | 58.8 | 1.6 |
| 20/75/5 | 8.56 | 59.0 | 8.21 | 56.6 | 4.1 |
| 60/35/5 | 8.71 | 60.1 | 8.40 | 57.9 | 3.6 |
| 65/30/5 | 8.66 | 59.7 | 8.04 | 55.4 | 7.2 |
| 70/28/2 | 8.73 | 60.2 | 8.29 | 57.2 | 5.0 |
| 74/24/2 | 8.65 | 59.6 | 7.83 | 54.0 | 9.5 |
| $C_4F_9OCH_3$/t-DCE/ethanol (100° C.) | | | | | |
| 54.4/44.7/0.9 | 87.56 | 604 | 87.56 | 604 | 0.0 |
| 54.8/45.1/0.1 | 87.49 | 603 | 87.48 | 603 | 0.0 |
| 54/41/5 | 86.56 | 597 | 85.95 | 593 | 0.7 |
| 50/45/5 | 86.64 | 597 | 86.28 | 595 | 0.4 |
| 50/40/10 | 84.48 | 582 | 82.14 | 566 | 2.8 |
| 40/50/10 | 84.63 | 584 | 83.25 | 574 | 1.6 |
| 30/60/10 | 84.10 | 580 | 82.38 | 568 | 2.0 |
| 60/30/10 | 83.29 | 574 | 77.56 | 535 | 6.9 |
| 60/28/12 | 81.89 | 565 | 73.80 | 509 | 9.9 |
| 70/28/2 | 86.23 | 594 | 83.32 | 574 | 3.4 |
| 74/24/2 | 85.30 | 588 | 80.14 | 553 | 6.0 |
| 50/46/4 | 86.98 | 600 | 86.79 | 599 | 2.2 |
| 28/70/2 | 86.16 | 594 | 79.98 | 551 | 7.2 |
| $C_4F_9OCH_3$/t-DCE/isopropanol (41.0° C.) | | | | | |
| 52.0/46.7/1.3 | 14.74 | 102 | 14.74 | 102 | 0.0 |
| 70/29/1 | 14.60 | 101 | 14.29 | 102 | 2.1 |
| 50/38/12 | 14.13 | 97.4 | 13.36 | 92.1 | 5.4 |
| 29/70/1 | 14.41 | 99.4 | 13.46 | 92.8 | 6.6 |
| 60/39.9/0.1 | 14.69 | 101 | 14.66 | 101 | 0.2 |
| $C_4F_9OCH_3$/c-DCE/methanol (25° C.) | | | | | |
| 66.0/32.6/1.4 | 7.05 | 48.6 | 7.05 | 48.6 | 0.0 |
| 66.7/33.2/0.1 | 7.00 | 48.3 | 7.00 | 48.3 | 0.0 |
| 58/38/4 | 6.97 | 48.1 | 6.92 | 47.7 | 0.7 |
| 56/40/4 | 6.97 | 48.1 | 6.91 | 47.6 | 0.9 |
| 60/30/10 | 6.69 | 46.1 | 6.32 | 43.6 | 5.5 |
| 60/28/12 | 6.59 | 45.4 | 5.95 | 41.0 | 9.7 |
| 70/28/2 | 7.04 | 48.5 | 7.02 | 48.4 | 0.3 |
| 75/23/2 | 7.03 | 48.5 | 6.93 | 47.8 | 1.4 |
| 80/18/2 | 6.97 | 48.1 | 6.61 | 45.6 | 5.2 |
| 82/16/2 | 6.94 | 47.8 | 6.36 | 43.9 | 8.4 |
| 40/58/2 | 6.99 | 48.2 | 6.57 | 45.3 | 6.0 |
| 39/59/2 | 6.99 | 48.2 | 6.41 | 44.2 | 8.3 |

-continued

| Refrigerant | 0 wt % evaporated | | 50 wt % evaporated | | % |
|---|---|---|---|---|---|
| Weight Percent | Psia | kPa | Psia | kPa | Change |
| $C_4F_9OCH_3$/c-DCB/ethanol (110° C.) | | | | | |
| 66.3/32.8/0.9 | 98.76 | 681 | 98.76 | 681 | 0.0 |
| 66.7/33.2/0.1 | 98.68 | 680 | 98.68 | 680 | 0.0 |
| 65.0/31.0/4.0 | 98.07 | 676 | 97.78 | 674 | 0.3 |
| 60/30/10 | 95.20 | 656 | 93.09 | 642 | 2.2 |
| 58/28/14 | 92.87 | 640 | 88.56 | 611 | 4.6 |
| 70/18/12 | 91.62 | 632 | 82.88 | 571 | 9.5 |
| 80/19/1 | 97.48 | 672 | 93.94 | 648 | 3.6 |
| 41/58/1 | 97.71 | 674 | 90.36 | 623 | 7.5 |
| $C_4F_9OCH_3$/acetone/methanol (25° C.) | | | | | |
| 80.4/14.3/5.3 | 4.04 | 27.9 | 4.04 | 27.9 | 0.0 |
| 82.6/16.4/1.0 | 3.94 | 27.2 | 3.93 | 27.1 | 0.3 |
| 99/0.5/0.5 | 4.11 | 28.3 | 4.10 | 28.3 | 0.2 |
| 50/40/10 | 4.21 | 29.0 | 4.17 | 28.8 | 1.0 |
| 1/85/14 | 4.54 | 31.3 | 4.54 | 31.3 | 0.0 |
| 90/1/9 | 3.98 | 27.4 | 3.96 | 27.3 | 0.5 |
| 60/20/20 | 3.91 | 27.0 | 3.77 | 26.0 | 3.5 |
| 40/30/30 | 3.94 | 27.2 | 3.66 | 25.2 | 7.1 |
| 20/50/30 | 4.20 | 29.0 | 3.99 | 27.5 | 5.0 |
| 10/50/40 | 4.13 | 28.5 | 3.78 | 26.1 | 8.5 |
| 10/60/30 | 4.30 | 29.6 | 4.13 | 28.5 | 4.0 |
| 1/98/1 | 4.47 | 30.8 | 4.46 | 30.8 | 0.2 |
| $C_4F_9OCH_3$/acetone/ethanol (75° C.) | | | | | |
| 85.1/11.1/3.8 | 23.11 | 159 | 23.11 | 159 | 0.0 |
| 99/0.5/0.5 | 23.56 | 162 | 23.54 | 162 | 0.1 |
| 0.56/99/0.5 | 26.77 | 185 | 26.76 | 184 | 0.0 |
| 80/5/15 | 22.19 | 153 | 21.58 | 149 | 2.7 |
| 70/10/20 | 21.84 | 151 | 21.04 | 145 | 3.7 |
| 60/20/20 | 22.47 | 155 | 21.86 | 151 | 2.7 |
| 50/25/25 | 22.49 | 155 | 21.61 | 149 | 3.9 |
| 40/40/20 | 23.86 | 165 | 32.28 | 161 | 2.4 |
| 30/60/10 | 25.34 | 175 | 25.05 | 173 | 1.1 |
| 30/45/25 | 23.95 | 165 | 23.15 | 160 | 3.3 |
| 30/40/30 | 23.35 | 161 | 22.25 | 153 | 4.7 |
| 60/10/30 | 20.88 | 144 | 19.25 | 133 | 7.8 |
| 20/50/30 | 24.04 | 166 | 23.03 | 159 | 4.2 |
| 10/60/30 | 24.64 | 170 | 23.74 | 164 | 1.0 |
| $C_4F_9OCH_3$/acetone/isopropanol (75° C.) | | | | | |
| 86.7/11.8/1.5 | 22.86 | 158 | 22.86 | 158 | 0.0 |
| 99/0.5/0.5 | 23.48 | 162 | 23.48 | 162 | 0.0 |
| 0.5/99/0.5 | 26.75 | 184 | 26.74 | 184 | 0.0 |
| 80/5/15 | 21.76 | 150 | 21.12 | 146 | 2.9 |
| 70/5/25 | 20.62 | 142 | 19.05 | 131 | 7.6 |
| 60/10/30 | 20.37 | 140 | 18.66 | 129 | 8.4 |
| 50/20/30 | 21.14 | 146 | 19.79 | 136 | 6.4 |
| 40/30/30 | 21.96 | 151 | 20.72 | 143 | 5.6 |
| 30/40/30 | 22.74 | 157 | 21.55 | 149 | 5.2 |
| 20/50/30 | 23.45 | 162 | 22.32 | 154 | 4.8 |
| 10/60/30 | 24.08 | 166 | 23.03 | 159 | 4.4 |
| 50/40/10 | 23.84 | 164 | 23.52 | 162 | 1.3 |
| 10/80/10 | 25.85 | 178 | 25.61 | 177 | 0.9 |

The results of this Example show that these compositions are azeotropic or azeotrope-like because when 50 wt. % of an original composition is removed, the vapor pressure of the remaining composition is within about 10% of the vapor pressure of the original composition, at a temperature of 25° C.

EXAMLE 9

Impact of Vapor Leakage at 57.1° C.

A leak test is performed on compositions of $C_4F9OCH_3$ and methanol, at the temperature of 57.1° C. The results are shown below:

| Refrigerant | 0 wt % evaporated | | 50 wt % evaporated | | % |
|---|---|---|---|---|---|
| Weight Percent | Psia | kPa | Psia | kPa | Change |
| $C_4F_9OCH_3$/methanol | | | | | |
| 93.5/6.5 | 14.72 | 101.5 | 14.72 | 101.5 | 0.0 |
| 99/1 | 13.95 | 96.2 | 13.79 | 95.1 | 1.1 |
| 80/20 | 14.04 | 96.8 | 13.52 | 93.2 | 3.7 |
| 70130 | 13.40 | 92.4 | 12.49 | 86.1 | 6.8 |
| 65/35 | 13.09 | 90.3 | 12.08 | 83.3 | 7.7 |
| 60/40 | 12.80 | 88.3 | 11.75 | 81.0 | 8.2 |

These results show that compositions of $C_4F_9OCH_3$ and methanol are azeotropic or azeotrope-like at different temperatures, but that the weight percents of the components vary as the temperature is changed.

EXAMPLE 10

Refrigerant Performance

The following table shows the performance of various refrigerants. The data are based on the following conditions.

| | |
|---|---|
| Evaporator temperature | 40.0° F. (4.4° C.) |
| Condenser temperature | 110.0° F. (43.3° C.) |
| Subcool | 10.0° F. (5.6° C.) |
| Return gas temperature | 75.0° F. (23.8° C.) |
| Compressor efficiency is 70%. | |

The refrigeration capacity is based on a compressor with a fixed displacement of 3.5 cubic feet per minute and 70% volumetric efficiency.

Capacity is intended to mean the change in enthalpy of the refrigerant in the evaporator per pound of refrigerant circulated, i.e., the heat removed by the refrigerant in the evaporator per time. Coefficient of performance (COP) is intended to mean the ratio of the capacity to compressor work. It is a measure of refrigerant energy efficiency.

| | Evap. Press. | | Cond. Press. | | Compr. Disch. T. | | | Capacity Btu/ | |
|---|---|---|---|---|---|---|---|---|---|
| | Psia | kPa | Psia | kPa | (°F.) | (°C.) | COP | min | kW |
| $C_4F_9OCH_3$/methanol | | | | | | | | | |
| 99/1 | 1.7 | 11 | 9.3 | 64 | 134.3 | 56.8 | 4.17 | 11.34 | 0.20 |
| 95/5 | 2.1 | 15 | 11.8 | 81 | 146.2 | 63.4 | 4.17 | 14.57 | 0.26 |
| $C_4F_9OCH_3$/ethanol | | | | | | | | | |
| 99/1 | 1.5 | 10 | 8.7 | 60 | 133.2 | 56.2 | 3.97 | 10.04 | 0.18 |
| 95/5 | 1.7 | 12 | 9.7 | 67 | 140.1 | 60.1 | 4.07 | 11.54 | 0.20 |
| $C_4F_9OCH_3$/isopropanol | | | | | | | | | |
| 99/1 | 1.5 | 10 | 8.5 | 59 | 132.5 | 55.8 | 3.95 | 9.79 | 0.17 |
| 95/5 | 1.6 | 11 | 9.1 | 63 | 136.9 | 58.3 | 4.02 | 10.68 | 0.19 |
| $C_4F_9OCH_3$/n-heptane | | | | | | | | | |
| 99/1 | 1.4 | 10 | 8.1 | 56 | 131.6 | 55.3 | 3.94 | 9.24 | 0.16 |
| 95/5 | 1.2 | 8 | 7.3 | 50 | 133.3 | 56.2 | 3.98 | 8.32 | 0.15 |
| $C_4F_9OCH_3$/t-DCE | | | | | | | | | |
| 99/1 | 1.6 | 11 | 9.0 | 62 | 131.3 | 55.2 | 4.09 | 10.85 | 0.19 |
| 55/45 | 4.0 | 28 | 19.3 | 133 | 168.9 | 76.1 | 4.09 | 25.06 | 0.44 |
| $C_4F_9OCH_3$/c-DCE | | | | | | | | | |
| 99/1 | 1.6 | 11 | 8.8 | 61 | 131.6 | 55.3 | 4.04 | 10.46 | 0.18 |

-continued

| | Evap. Press. | | Cond. Press. | | Compr. Disch. T. | | | Capacity Btu/ | |
|---|---|---|---|---|---|---|---|---|---|
| | Psia | kPa | Psia | kPa | (°F.) | (°C.) | COP | min | kW |
| 69/32 | 3.0 | 21 | 14.9 | 103 | 161.0 | 71.6 | 4.10 | 19.09 | 0.34 |
| C$_4$F$_9$OCH$_3$/acetone | | | | | | | | | |
| 99/1 | 1.7 | 12 | 9.3 | 64 | 131.6 | 55.3 | 4.12 | 11.29 | 0.20 |
| 85/15 | 2.9 | 20 | 14.8 | 102 | 146.8 | 63.8 | 4.11 | 18.61 | 0.33 |
| C$_4$F$_9$OCH$_3$/n-heptane/methanol | | | | | | | | | |
| 98/1/1 | 1.6 | 11 | 9.1 | 63 | 134.6 | 57.0 | 4.06 | 10.75 | 0.19 |
| 92/4/4 | 1.8 | 12 | 10.3 | 71 | 144.2 | 62.3 | 4.21 | 12.60 | 0.22 |
| C$_4$F$_9$OCH$_3$/n-heptane/ethanol | | | | | | | | | |
| 98/1/1 | 1.5 | 10 | 8.4 | 58 | 133.5 | 56.4 | 3.98 | 9.80 | 0.17 |
| 92/5/3 | 1.4 | 10 | 8.2 | 57 | 138.2 | 59.0 | 4.08 | 9.65 | 0.17 |
| C$_4$F$_9$OCH$_3$/n-heptane/isopropanol | | | | | | | | | |
| 98/1/1 | 1.5 | 10 | 8.3 | 57 | 132.8 | 56.0 | 3.97 | 9.56 | 0.17 |
| 90/5/5 | 1.4 | 10 | 8.1 | 56 | 138.5 | 59.2 | 4.06 | 9.49 | 0.17 |
| C$_4$F$_9$OCH$_3$/t-DCE/methnaol | | | | | | | | | |
| 98/1/1 | 1.8 | 12 | 10.0 | 69 | 134.4 | 56.9 | 4.18 | 12.31 | 0.22 |
| 50/44/6 | 4.4 | 30 | 21.3 | 147 | 183.3 | 84.1 | 4.18 | 28.57 | 0.50 |
| C$_4$F$_9$OCH$_3$/t-DCE/ethanol | | | | | | | | | |
| 98/1/1 | 1.7 | 12 | 9.3 | 64 | 133.2 | 66.2 | 4.12 | 11.36 | 0.20 |
| 60/35/5 | 3.5 | 24 | 17.4 | 120 | 177.4 | 80.8 | 4.21 | 23.13 | 0.41 |
| C$_4$F$_9$OCH$_3$/c-DCE/methanol | | | | | | | | | |
| 98/1/1 | 1.8 | 12 | 9.8 | 68 | 134.7 | 57.1 | 4.13 | 11.91 | 0.21 |
| 60/35/5 | 3.5 | 24 | 17.4 | 120 | 177.4 | 80.8 | 4.21 | 23.13 | 0.41 |
| C$_4$F$_9$OCH$_3$/c-DCE/ethanol | | | | | | | | | |
| 98/1/1 | 1.6 | 11 | 9.2 | 63 | 133.5 | 56.4 | 4.07 | 10.95 | 0.19 |
| 65/30/5 | 3.0 | 21 | 15.1 | 104 | 166.6 | 74.8 | 4.17 | 19.55 | 0.34 |
| C$_4$F$_9$OCH$_3$/acetone/methanol | | | | | | | | | |
| 98/1/1 | 1.9 | 13 | 10.2 | 70 | 134.7 | 57.1 | 4.20 | 12.68 | 0.22 |
| 80/10/10 | 3.3 | 23 | 17.1 | 118 | 166.2 | 74.5 | 4.27 | 22.46 | 0.40 |
| C$_4$F$_9$OCH$_3$/acetone/ethanol | | | | | | | | | |
| 98/1/1 | 1.8 | 12 | 9.6 | 66 | 133.5 | 56.4 | 4.14 | 11.76 | 0.21 |
| 85/10/5 | 2.7 | 19 | 14.1 | 97 | 148.9 | 64.9 | 4.24 | 18.21 | 0.32 |
| C$_4$F$_9$OCH$_3$/acetone/isopropanol | | | | | | | | | |
| 98/1/1 | 1.7 | 12 | 9.5 | 66 | 132.9 | 56.1 | 4.12 | 11.52 | 0.20 |
| 85/10/5 | 2.6 | 18 | 13.5 | 93 | 146.1 | 63.4 | 4.22 | 17.34 | 0.31 |
| C$_4$F$_9$OCH$_3$/t-DCE/isopropanol | | | | | | | | | |
| 98/1/1 | 1.7 | 12 | 9.2 | 63 | 132.6 | 55.9 | 4.10 | 11.10 | 0.20 |
| 52/47/1 | 4.1 | 28 | 18.3 | 126 | 167.7 | 75.4 | 4.33 | 25.83 | 0.45 |
| C$_4$F$_9$OCH$_3$/HFC-43-10mee/methanol | | | | | | | | | |
| 98/1/1 | 1.7 | 12 | 9.3 | 64 | 134.3 | 56.8 | 4.05 | 11.04 | 0.19 |
| 45/48/7 | 2.1 | 14 | 11.9 | 82 | 153.5 | 67.5 | 4.19 | 14.78 | 0.26 |

EXAMPLE 11

Heat Transfer Media

Data below show heat transfer performance characteristics of compounds of the present invention. Pressure Drop Factor (Fp) is an indication of energy loss due to friction between fluid and pipe-wall with a low value being desirable. Heat Transfer Factor (Fh) is an indication of the ability of the fluid to transfer heat, with a high value desirable. Temperature Difference Factor (Fv) is a measure of the temperature change of the fluid in the process of transferring heat with a low value desirable. Pump Power Ratio is a comparison of the pumping energy with any one fluid. A lower value indicates less energy is required for pumping a given fluid.

| | Pressure Drop Factor (Fp) | | |
|---|---|---|---|
| Compounds (wt. percents) | −40° F. (−40° C.) | 0° F. (−18° C.) | 40° F. (4° C.) |
| C$_4$F$_9$OCH$_3$ | 0.0391 | 0.0346 | 0.0310 |
| C$_4$F$_9$OCH$_3$/methanol (95/5) | 0.0390 | 0.0344 | 0.0306 |
| C$_4$F$_9$OCH$_3$/ethanol (95/5) | 0.0394 | 0.0346 | 0.0308 |
| C$_4$F$_9$OCH$_3$/isopropanol (95/5) | 0.0396 | 0.0347 | 0.0310 |
| C$_4$F$_9$OCH$_3$/n-heptane (95/5) | 0.0379 | 0.0336 | 0.0301 |
| C$_4$F$_9$OCH$_3$/c-DCE (68/32) | 0.0368 | 0.0330 | 0.0298 |
| C$_4$F$_9$OCH$_3$/acetone (85/15) | 0.0354 | 0.0314 | 0.0282 |
| C$_4$F$_9$OCH$_3$/n-heptane/methanol (92/4/4) | 0.0381 | 0.0336 | 0.0300 |
| C$_4$F$_9$OCH$_3$/n-heptane/ethanol (92/5/3) | 0.0372 | 0.0348 | 0.0328 |
| C$_4$F$_9$OCH$_3$/n-heptane/isopropanol (90/5/5) | 0.0384 | 0.0337 | 0.0301 |
| C$_4$F$_9$OCH$_3$/c-DCE/methanol (60/35/5) | 0.0366 | 0.0326 | 0.0294 |
| C$_4$F$_9$OCH$_3$/c-DCE/ethanol (65/30/5) | 0.0372 | 0.0330 | 0.0297 |
| C$_4$F$_9$OCH$_3$/acetone/methanol (80/10/10) | 0.0356 | 0.0312 | 0.0277 |
| C$_4$F$_9$OCH$_3$/acetone/ethanol (85/10/5) | 0.0369 | 0.0325 | 0.0290 |
| C$_4$F$_9$OCH$_3$/acetone/isopropanol (85/10/5) | 0.0371 | 0.0326 | 0.0291 |

| | Heat Transfer Factor (Fh) | | |
|---|---|---|---|
| Compounds (wt. percents) | −40° F. (−40° C.) | 0° F. (−18° C.) | 40° F. (4° C.) |
| C$_4$F$_9$OCH$_3$ | 0.147 | 0.180 | 0.212 |
| C$_4$F$_9$OCH$_3$/methanol (95/5) | 0.150 | 0.187 | 0.221 |
| C$_4$F$_9$OCH$_3$/ethanol (95/5) | 0.147 | 0.182 | 0.217 |
| C$_4$F$_9$OCH$_3$/isopropanol (95/5) | 0.144 | 0.180 | 0.214 |
| C$_4$F$_9$OCH$_3$/n-heptane (95/5) | 0.152 | 0.186 | 0.219 |
| C$_4$F$_9$OCH$_3$/c-DCE (68/32) | 0.164 | 0.196 | 0.226 |
| C$_4$F$_9$OCH$_3$/acetone (85/15) | 0.170 | 0.207 | 0.242 |
| C$_4$F$_9$OCH$_3$/n-heptane/methanol (92/4/4) | 0.154 | 0.190 | 0.225 |
| C$_4$F$_9$OCH$_3$/n-heptane/ethanol (92/5/3) | 0.150 | 0.186 | 0.220 |
| C$_4$F$_9$OCH$_3$/n-heptane/isopropanol (90/5/5) | 0.148 | 0.185 | 0.221 |
| C$_4$F$_9$OCH$_3$/c-DCE/methanol (60/35/5) | 0.168 | 0.203 | 0.236 |
| C$_4$F$_9$OCH$_3$/c-DCE/ethanol (65/30/5) | 0.161 | 0.197 | 0.230 |
| C$_4$F$_9$OCH$_3$/acetone/methanol (80/10/10) | 0.163 | 0.204 | 0.244 |
| C$_4$F$_9$OCH$_3$/acetone/ethanol (85/10/5) | 0.160 | 0.199 | 0.236 |
| C$_4$F$_9$OCH$_3$/acetone/isopropanol (85/10/5) | 0.157 | 0.177 | 0.233 |

| | Temperature Difference Factor (Fv) | | |
|---|---|---|---|
| Compounds (wt. percents) | −40° F. (−40° C.) | 0° F. (−18° C.) | 40° F. (4° C.) |
| C$_4$F$_9$OCH$_3$ | 2.70 | 2.12 | 1.75 |
| C$_4$F$_9$OCH$_3$/methanol (95/5) | 2.63 | 2.04 | 1.67 |
| C$_4$F$_9$OCH$_3$/ethanol (95/5) | 2.71 | 2.10 | 1.71 |
| C$_4$F$_9$OCH$_3$/isopropanol (95/5) | 2.77 | 2.13 | 1.73 |
| C$_4$F$_9$OCH$_3$/n-heptane (95/5) | 2.58 | 2.03 | 1.68 |
| C$_4$F$_9$OCH$_3$/c-DCE (68/32) | 2.38 | 1.92 | 1.62 |
| C$_4$F$_9$OCH$_3$/acetone (85/15) | 2.26 | 1.79 | 1.49 |
| C$_4$F$_9$OCH$_3$/n-heptane/methanol (92/4/4) | 2.56 | 1.99 | 1.63 |
| C$_4$F$_9$OCH$_3$/n-heptane/ethanol (92/5/3) | 2.60 | 2.03 | 1.66 |
| C$_4$F$_9$OCH$_3$/n-heptane/isopropanol (90/5/5) | 2.66 | 2.05 | 1.67 |
| C$_4$F$_9$OCH$_3$/c-DCE/methanol (60/35/5) | 2.32 | 1.85 | 1.55 |
| C$_4$F$_9$OCH$_3$/c-DCE/ethanol (65/30/5) | 2.43 | 1.92 | 1.59 |
| C$_4$F$_9$OCH$_3$/acetone/methanol (80/10/10) | 2.37 | 1.82 | 1.47 |
| C$_4$F$_9$OCH$_3$/acetone/ethanol (85/10/5) | 2.43 | 1.89 | 1.54 |

-continued

| Compounds (wt. percents) | | | |
|---|---|---|---|
| $C_4F_9OCH_3$/acetone/isopropanol (85/10/5) | 2.48 | 1.92 | 1.56 |

| | Pump Power Ratio | | |
|---|---|---|---|
| Compounds (wt. percents) | −40° F. (−40° C.) | 0° F. (−18° C.) | 40° F. (4° C.) |
| $C_4F_9OCH_3$ | 1.00 | 1.00 | 1.00 |
| $C_4F_9OCH_3$/methanol (95/5) | 0.92 | 0.87 | 0.84 |
| $C_4F_9OCH_3$/ethanol (95/5) | 1.01 | 0.96 | 0.92 |
| $C_4F_9OCH_3$/isopropanol (95/5) | 1.09 | 1.01 | 0.96 |
| $C_4F_9OCH_3$/n-heptane (95/5) | 0.86 | 0.86 | 0.86 |
| $C_4F_9OCH_3$/c-DCE (68/32) | 0.64 | 0.71 | 0.76 |
| $C_4F_9OCH_3$/acetone (85/15) | 0.54 | 0.55 | 0.57 |
| $C_4F_9OCH_3$/n-heptane/methanol (92/4/4) | 0.83 | 0.80 | 0.78 |
| $C_4F_9OCH_3$/n-heptane/ethanol (92/5/3) | 0.87 | 0.85 | 0.83 |
| $C_4F_9OCH_3$/n-heptane/isopropanol (90/5/5) | 0.95 | 0.88 | 0.84 |
| $C_4F_9OCH_3$/c-DCE/methanol (60/35/5) | 0.59 | 0.62 | 0.65 |
| $C_4F_9OCH_3$/c-DCE/ethanol (65/30/5) | 0.69 | 0.70 | 0.72 |
| $C_4F_9OCH_3$/acetone/methanol (80/10/10) | 0.64 | 0.58 | 0.55 |
| $C_4F_9OCH_3$/acetone/ethanol (85/10/5) | 0.69 | 0.66 | 0.64 |
| $C_4F_9OCH_3$/acetone/isopropanol (85/10/5) | 0.75 | 0.70 | 0.67 |

Data above show compounds of the present invention have heat transfer performance comparable to pure $C_4F_9OCH_3$ and are therefore suitable as heat transfer media.

The novel compositions of this invention, including the azeotropic or azeotrope-like compositions, may be used as cleaning agents to clean, for example, electronic circuit boards. It is preferred that cleaning agents be azeotropic or azeotrope-like because in vapor degreasing operations, the cleaning agent is generally redistilled and reused for final rinse cleaning. The novel compositions may also be used as displacement drying agents to remove water from surfaces.

The novel compositions of this invention, including the azeotropic or azeotrope-like compositions, may be used to produce refrigeration by condensing the compositions and thereafter evaporating the condensate in the vicinity of a body to be cooled. The novel compositions may also be used to produce heat by condensing the refrigerant in the vicinity of the body to be heated and thereafter evaporating the refrigerant.

The novel compositions of this invention are particularly suitable for replacing compounds that may affect the ozone layer, including R-113 and R-11.

In addition to cleaning and refrigeration applications, the novel constant boiling or substantially constant boiling compositions of the invention are also useful as aerosol propellants, heat transfer media, gaseous dielectrics, fire extinguishing agents, expansion agents for polyolefins and polyurethanes and power cycle working fluids.

Additional Compounds

Other components, such as aliphatic hydrocarbons having a boiling point of about 0° to 100° C., hydrofluorocarbon-alkanes having a boiling point of about 0° to 100° C., hydrofluoropropanes having a boiling point of between about 0° to 100° C., hydrocarbon esters having a boiling point between about 0° to 100° C., hydrochlorofluorocarbons having a boiling point between about 0° to 100° C., hydrofluorocarbons having a boiling point of about 0° to 100° C., hydrochlorocarbons having a boiling point between about 0° to 100° C., chlorocarbons and perfluorinated compounds, can be added in small amounts to the azeotropic or azeotrope-like compositions described above without substantially changing the properties thereof, including the constant boiling behavior, of the compositions.

Additives such as lubricants, corrosion inhibitors, surfactants, stabilizers, dyes and other appropriate materials may be added to the novel compositions of the invention for a variety of purposes provide they do not have an adverse influence on the composition for its intended application. Preferred lubricants include esters having a molecular weight greater than 250.

What is claimed is:

1. A composition comprising nonafluoromethoxybutane; a compound selected from the group consisting of methanol, ethanol and isopropanol; and a compound selected from the group consisting of n-heptane, cis-1,2-dichloroethylene and acetone.

2. The composition of claim 1 comprising nonafluoromethoxybutane, n-heptane and a compound selected from the group consisting of methanol, ethanol and isopropanol.

3. The composition of claim 1 comprising nonafluoromethoxybutane, cis-1,2-dichloroethylene and methanol or ethanol.

4. The composition of claim 1 comprising nonafluoromethoxybutane, acetone and a compound selected from the group consisting of methanol, ethanol and isopropanol.

5. A composition comprising 80–99 weight percent nonafluoromethoxybutane, 0.5–18 weight percent n-heptane and 0.5–19 weight percent methanol; 75–99 weight percent nonafluoromethoxybutane, 0.5–24 weight percent n-heptane and 0.5–24 weight percent ethanol; 70–99 weight percent nonafluoromethoxybutane, 0.5–29 weight percent n-heptane and 0.5–29 weight percent isopropanol; 39–82 weight percent nonafluoromethoxybutane, 16–59 weight percent cis-1,2-dichloroethylene and 0.1–12 weight percent methanol; 41–80 weight percent nonafluoromethoxybutane, 19–58 weight percent cis-1,2-dichloroethylene and 0.1–14 weight percent ethanol; 0.5–99 weight percent nonafluoromethoxybutane, 0.5–99 weight percent acetone and 0.5–40 weight percent methanol; 0.5–99 weight percent nonafluoromethoxybutane, 0.5–99 weight percent acetone and 0.5–30 weight percent ethanol; or 0.5–99 weight percent nonafluoromethoxybutane, 0.5–99 weight percent acetone and 0.5–30 weight percent isopropanol.

* * * * *